United States Patent
Allen

(10) Patent No.: US 8,177,238 B2
(45) Date of Patent: May 15, 2012

(54) SYSTEM AND METHOD OF A FLANGE SEAL RING

(75) Inventor: Charles R Allen, Houston, TX (US)

(73) Assignee: Daniel Measurement and Control, Inc., Houston, TX (US)

( * ) Notice: Subject to any disclaimer, the term of this patent is extended or adjusted under 35 U.S.C. 154(b) by 931 days.

(21) Appl. No.: 12/041,691

(22) Filed: Mar. 4, 2008

(65) Prior Publication Data
US 2009/0224488 A1    Sep. 10, 2009

(51) Int. Cl.
*F16J 15/02* (2006.01)

(52) U.S. Cl. ........................... 277/616; 277/609

(58) Field of Classification Search .................. 277/608, 277/609, 616
See application file for complete search history.

(56) References Cited

U.S. PATENT DOCUMENTS

| | | | |
|---|---|---|---|
| 2,513,178 A | 6/1950 | Jackson | |
| 3,989,285 A | 11/1976 | Yancey | |
| 4,168,852 A | 9/1979 | Ahlstone | |
| 4,168,853 A | 9/1979 | Ahlstone | |
| 4,900,063 A | 2/1990 | Baarfusser | |
| 5,466,018 A | 11/1995 | Stobbart | |
| 6,543,120 B2 | 4/2003 | Aaron | |
| 6,648,339 B2 * | 11/2003 | Russell | 277/617 |
| 2001/0045700 A1 | 11/2001 | Russell | |
| 2007/0024007 A1 | 2/2007 | Putch | |

FOREIGN PATENT DOCUMENTS

| | | |
|---|---|---|
| DE | 3933820 A1 | 1/2012 |
| WO | 0163166 | 8/2001 |

OTHER PUBLICATIONS

International Search Report and Written Opinion for International PCT No. PCT/US2009/036026 filed Mar. 4, 2009.
English translation of Office Action issued on Nov. 8, 2011 in counterpart Chinese Patent Application No. 200980107311.5.
Extended Search Report issued on Dec. 21, 2011 in counterpart European Patent Application No. EP09717580.

* cited by examiner

*Primary Examiner* — Gilbert Lee
(74) *Attorney, Agent, or Firm* — Mark E. Scott; Conley Rose, P.C.

(57) ABSTRACT

Method and system of a flange seal ring. At least some of the illustrative embodiments are systems comprising a metallic ring and a plurality of cogs. The metallic ring comprises a central bore that defines an internal diameter, a first sealing face that defines a first plane, a second sealing face that defines a second plane, a first groove in the first sealing face, and a second groove in the second sealing face. The plurality of cogs couple to the metallic ring, each cog extends through the first plane, and the plurality of cogs positioned one each at a plurality of radial positions around the metallic ring. At least one of the plurality of cogs configured to have an adjustable position relative to the central bore, and the cogs configured to align the central bore to a corresponding bore of a flange.

11 Claims, 4 Drawing Sheets

SYSTEM AND METHOD OF A FLANGE SEAL RING

BACKGROUND

In situations where pipes need to be connected together in a semi-permanent fashion, each pipe end is fitted with a flange, and the flanges are bolted together. There are several types of flanges, defined in part by the type of sealing surface provided on each flange face. For example, a raised face flange has a sealing surface that is raised in relation to the portion of the flange through which bolts extend, and the raised face is either smooth or has shallow circular grooves. When mating raised face flanges, a gasket material is positioned between the raised faces and held in place by compressive forces supplied by the bolts. A ring-type joint (RTJ) flange is yet another example of a type of flange. RTJ flanges have a circular ring groove on the flange face. A metallic ring, or ring gasket, is placed between two RTJ flanges in the ring groove, and the ring gasket is deformed or "coined" between the flanges to provide a seal. The compressive forces to deform the ring supplied by the bolts.

In addition to different types of flanges, there are also different ratings for flanges, even of the same type. For example, a raised face flange for 30 inch pipe may come in a variety of ANSI ratings directly related to the internal pressure expected in the pipe. Size of the sealing surface for raised face flanges may vary slightly from flange-to-flange for a given flange size, in spite of each flange having a central passage of the same internal diameter. Likewise, the depth, width and/or location of a ring groove for RTJ flanges may change for different pressure ratings or may vary slightly from flange-to-flange in spite of each flange having a central passage of the same internal diameter.

Ultrasonic flow meters are used to measure fluid flow (e.g., natural gas, oil, water) in a pipe. In some situations, ultrasonic meters are used to measure fluid flow for custody exchange purposes, and thus particular accuracy is needed. In order to verify the accuracy of an ultrasonic meter, new meters (and possibly rebuilt meters) require a flow calibration at a testing laboratory. However, selection of a flange type and pressure rating for a meter is customer dependent. Situations thus occur where a testing laboratory has a set of piping having an internal diameter matching that of an ultrasonic meter (e.g., 30 inches), as required by testing standards, but the testing laboratory may have flanges with different seal types and/or different pressure ratings. For example, the testing laboratory may use RTJ flanges having first pressure rating, and the meter to be tested may use raised face flanges having different pressure ratings than the RTJ flanges. Testing laboratories have addressed the issue in the past by having a plurality of pipe "spools" with each spool having different flange type on the meter end. However, construction and storing such spools is expensive, in some cases costing more than the meter to be tested.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, flow meter designers and manufacturers may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure. In addition, one skilled in the art will understand that the following description has broad application, and the discussion of any embodiment is meant only to be exemplary of that embodiment, and not intended to intimate that the scope of the disclosure is limited to that embodiment.

The various embodiments are directed to a flange seal ring that enables coupling of flanges of varying types (e.g., raised face, ring-type joint (RTJ)) and in some cases varying pressure ratings, without the need for adapters or pipe "spools". For example, the flange seal ring of the various embodiments enables coupling a meter (e.g., ultrasonic meter) having a 150 ANSI raised face flange to piping of a testing laboratory having a 900 ANSI RTJ flange. Before turning to illustrative physical embodiments of the flange seal ring, the specification digresses briefly to a discussion of two specific types of flanges.

Figure 1:
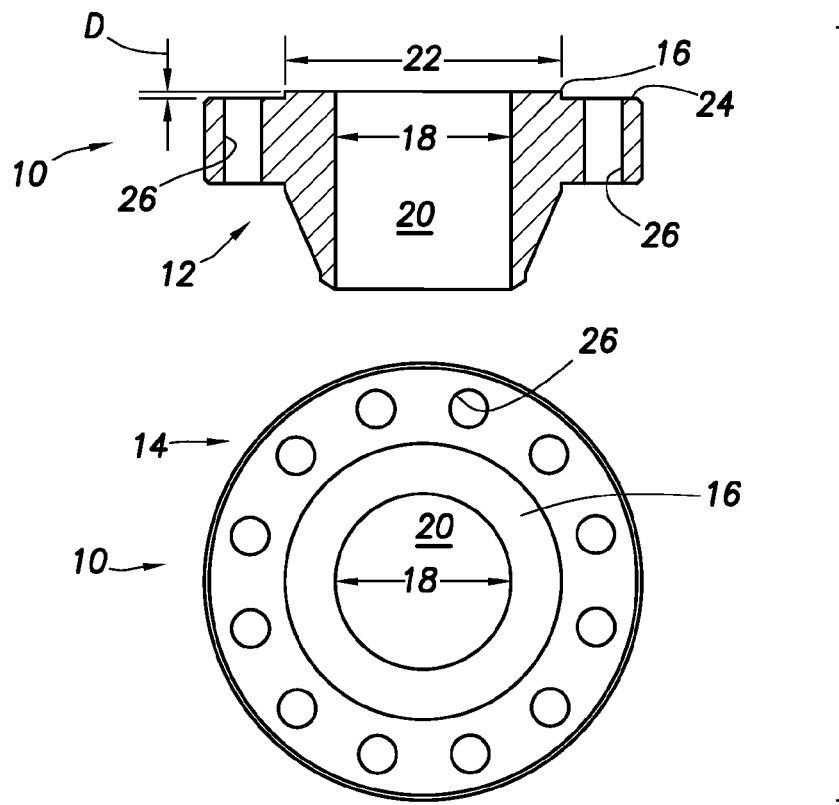
FIG. 1 illustrates a raised face flange.
Figure 2:
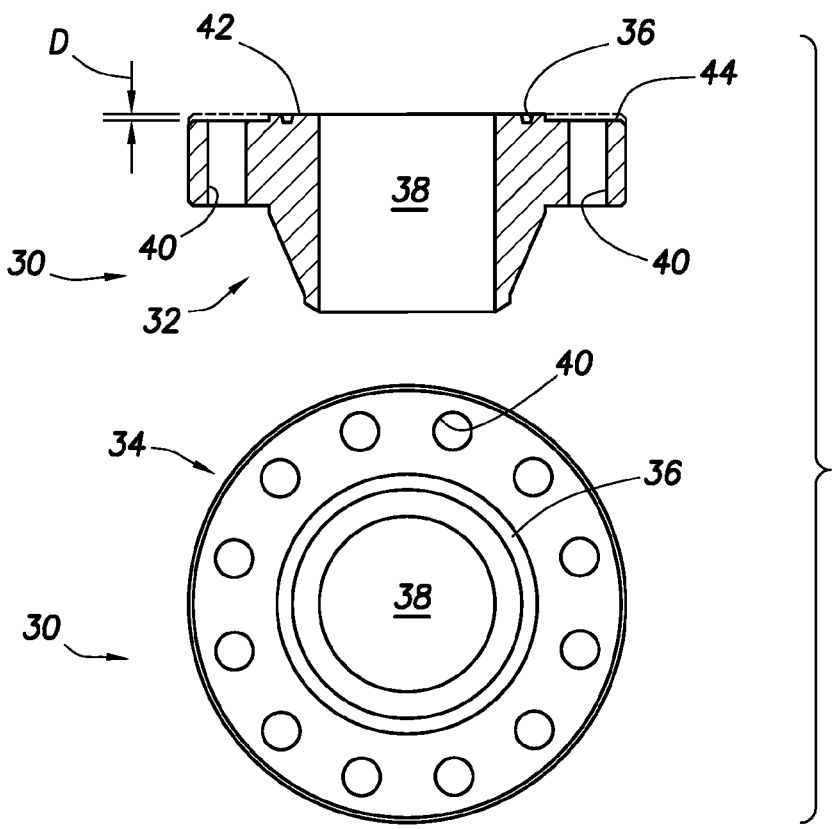
FIG. 2 illustrates a ring-type joint flange.

FIG. 1 illustrates a raised face flange 10 usable with the flange seal ring of the various embodiments (not shown in FIG. 2). In particular, FIG. 1 illustrates both a cross-sectional view 12 and an elevation view 14 of a raised face flange 10. The sealing feature of a raised face flange is the raised face 16. The raised face 16 is defined by an inside diameter 18 of the central bore or central passage 20, and an outside diameter 22 of the raised face 16. As the name implies, the raised face is offset from the bolt face 24 by a distance "D", which distance varies depending on the pressure rating of the flange. For example, in some pressure ratings the offset D is 0.06 inches (1.524 millimeters (mm)), and yet for other, higher pressure ratings the offset D is 0.25 inches (6.35 mm). When coupling two raised face flanges, a gasket material occupies the space between the two sealing surfaces, and the seal is achieved by compressive force supply by bolts in bolt holes 26.

FIG. 2 illustrates a RTJ flange 30 usable with the flange seal ring of the various embodiments (not shown in FIG. 2). In particular, FIG. 2 illustrates both a cross-sectional view 32 and an elevation view 34 of the RTJ flange 30. The sealing feature of a RTJ flange is ring groove 36. The ring groove 36 lies between the central passage 38 and the bolt holes 40. On some RTJ flanges, the surface 42 within which the ring groove 36 is cut is also offset from the bolt face 44 by a distance "D", but such an offset is not necessarily present. The width, depth and/or diameter of the ring groove 36 may vary for different pressure ratings, with larger ring grooves 36 (and correspondingly larger metallic ring gaskets) for higher pressure ratings. When coupling two RTJ flanges, the metallic ring gasket is placed between the flanges, and the metallic ring gasket resides at least partially within the ring groove 36 of each flange. The seal is achieved by deforming the metallic ring gasket by way of the compressive force supply by bolts in bolt holes 40. The specification now turns to the illustrative embodiments of a flange seal ring.

Figure 3:
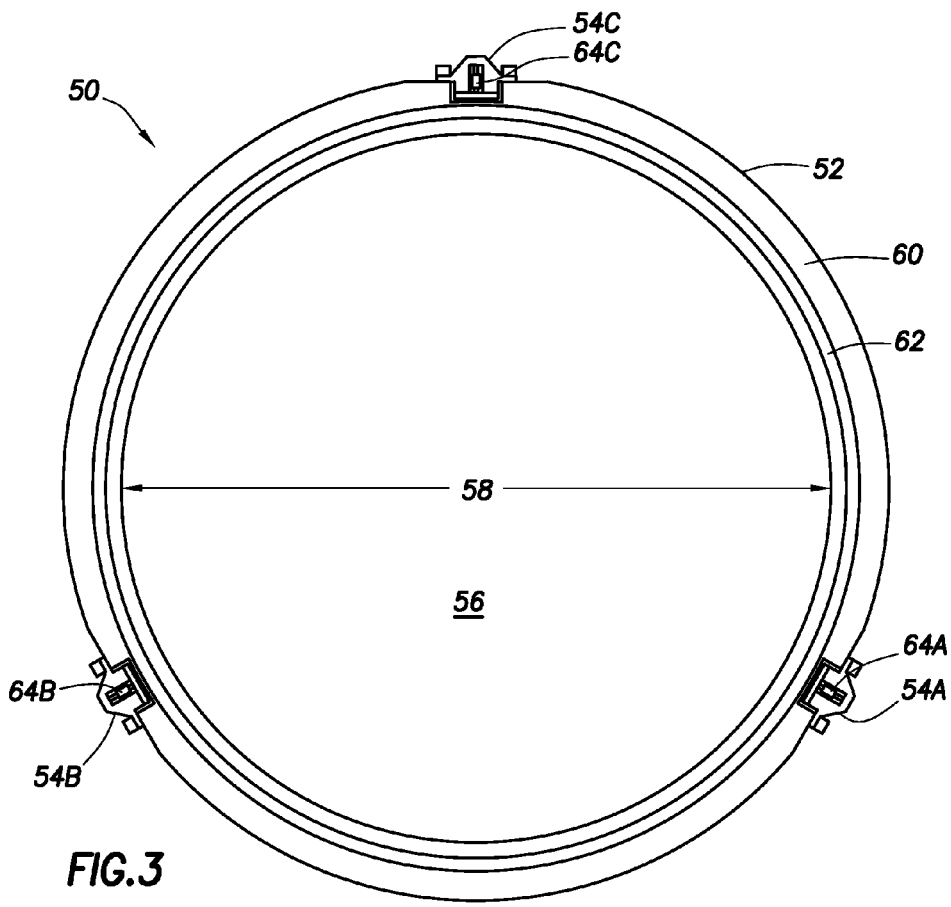
FIG. 3 illustrates a flange seal ring in accordance with at least some embodiments.

FIG. 3 illustrates an elevation view of a flange seal ring 50 in accordance with at least some embodiments. In particular, FIG. 3 illustrates the flange seal ring 50 comprises a metallic ring 52, and a plurality of block assemblies 54 (labeled 54A, 54B, and 54C in FIG. 3). In some embodiments, the metallic ring 52 is made of carbon steel. In other embodiments, such as low pressure applications, other metals may be equivalently used (e.g., aluminum). The metallic ring 52 defines a central bore 56 having an internal diameter 58. The flange seal ring 50 further comprises a sealing face 60 that defines a plane (in the case of FIG. 3, the plane is parallel to the page). The central bore 56 is substantially perpendicular to the plane defined by the sealing face 60 (i.e., perpendicular within manufacturing tolerances). Though not visible in FIG. 3, the metallic ring 52 further comprises a second sealing face on the opposite side of the metallic ring 52, which sealing face likewise defines a plane. In some embodiments, the plane defined by the first sealing face 60 and the second sealing face are substantially flat (i.e., flat within manufacturing tolerances) and substantially parallel (i.e., parallel within manufacturing tolerances).

The metallic ring 52 further comprises an o-ring groove 62 that encircles the intersection of the central bore 56 and the sealing face 60. Again, though not visible in FIG. 3, the second sealing face on the opposite side likewise has an o-ring groove. In embodiments configured for use with a 0.50 inch (12.7 mm) diameter elastomeric o-ring, each o-ring groove 62 is 0.375 inch (9.525 mm) in depth, 0.560 inch (14.224 mm) in width at the sealing face 60, and has a 5 degree angle (the groove becoming more narrow with depth into the metallic ring 52). O-rings of different diameter may be equivalently used, and the width, depth and/or angle of the o-ring grooves may change accordingly.

The flange seal ring 50 further comprises a plurality of block assemblies 54. In the illustrative case of FIG. 3, three such block assemblies 54 are present at equally spaced radial locations on the outside diameter of the metallic ring 52. Though three such block assemblies 54 are shown, greater or fewer block assemblies may be equivalently used. Each block assembly comprises a cog portion 64. Though the relationship of the cog portions 64 to the metallic ring 52 are discussed more below, each of the cog portions extend through the plane defined by the sealing face 60 (i.e., out of the page). In accordance with some embodiments the cog portions 64 of the block assemblies 54 are made of carbon steel, but in other embodiments (e.g., smaller diameter metallic rings) the cog portions 64 may be made of other materials (e.g., aluminum, plastic).

Figure 4:
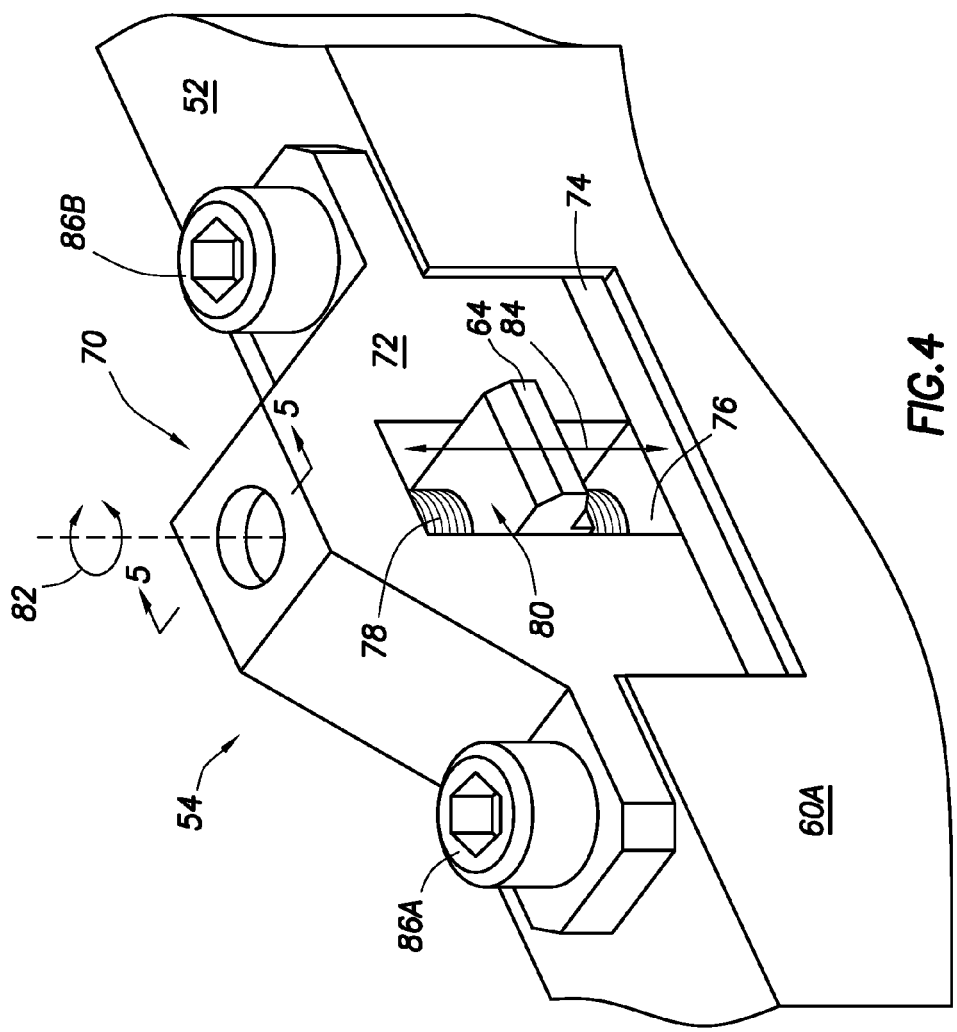
FIG. 4 illustrates a perspective view of a block assembly in accordance with at least some embodiments.

FIG. 4 illustrates a perspective view of a block assembly 54 in accordance with at least some embodiments. In particular, FIG. 4 illustrates that block assemblies in accordance with at least some embodiments comprise a housing 70 made up of an upper housing 72 and lower housing 74. The housing defines an interior volume 76 within which resides a lead screw 78. The lead screw 78 comprises a shaft with external threads, and the cog 80 comprises an aperture with internal threads. As illustrated in FIG. 4, the cog 80 threadingly couples to the lead screw 78 by way of the aperture. By rotation of the lead screw 78, as illustrated by arrow 82, the location the cog 80 may be adjusted, as indicated by arrow 84. Cog 80 comprises multiple cog portions, but in the perspective view of FIG. 4 only cog portion 64 is visible.

Figure 5:
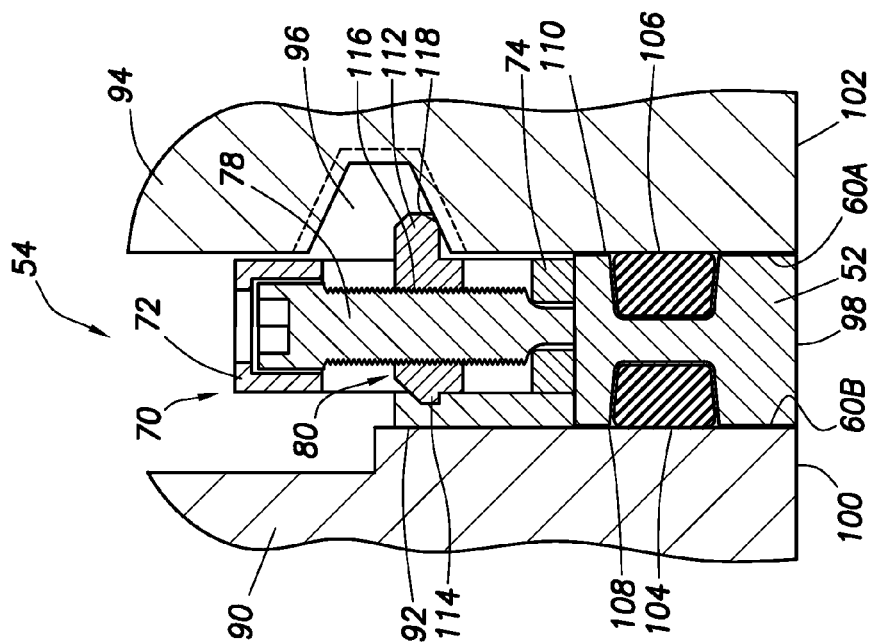
FIG. 5 illustrates a cross-sectional, elevation view of the block assembly of FIG. 5 taken along line 5-5 of FIG. 4.

FIG. 5 is a cross-sectional, elevation view of the block assembly 54 taken substantially along lines 5-5 of FIG. 4. Moreover, FIG. 5 illustrates portions of two flanges having differing sealing features in operational relationship to the block assembly 54 and metallic ring 52. In particular, FIG. 5 illustrates a portion of raised face flange 90 having a sealing feature in the form of a raised face 92, and a portion of a RTJ flange 94 having a sealing feature in the form of a ring groove 96. The inside diameter 98 of the central bore of the metallic ring 52 aligns with the inside diameters 100 and 102 of the raised face and RTJ flanges 90 and 94, respectively. Two o-rings 104 and 106 reside one each within the o-ring grooves 108 and 110, respectively. Because of compression force supplied by the bolts through the flanges, the o-rings 104 and 106 compress between the flanges and their respective o-ring grooves, forming a seal.

Still referring to FIG. 5, the block assembly 54 housing 70 comprises the upper housing 72 and the lower housing 74. Having a multiple-piece housing enables insertion of the lead screw 78 and cog 80 within the internal volume during assembly. After insertion of the various internal components, the lower housing 74 is coupled to the upper housing 72, such as fasteners (e.g., bolts), welding or epoxy. Having the housing 70 separable near its base is merely illustrative. The housing 70 may be equivalently separable at any location that facilitates insertion of the lead screw 78 and cog 80. Cog 80 comprises a large cog portion 112, a small cog portion 114, and an internally threaded aperture 116. In the illustrative embodiments of FIG. 5, the large cog portion 112 is configured to extend through a plane defined by the sealing surface 60A, and the large cog portion 112 interacts or mates with a portion of the sealing feature of the RTJ flange 94. In particular, mitered portion 118 of the large cog portion 112 contacts and/or couples to the ring groove 96. The size of the ring groove 96 may change as between RTJ flanges with differing pressure ratings (as illustrated by the dashed lines). In the event the flange seal ring 50 is used with a RTJ flange with larger ring groove 96 but same central passage internal diameter, the position of the cog 80 may be correspondingly changed by virtue of lead screw 78 to ensure contact of the large cog portion 112 to the ring groove 96 wall. In the configuration of FIG. 5, the small cog portion 114 extends opposite the large cog portion 112, and resides between the planes defined by the sealing surfaces 60A and 60B.

Figure 6:
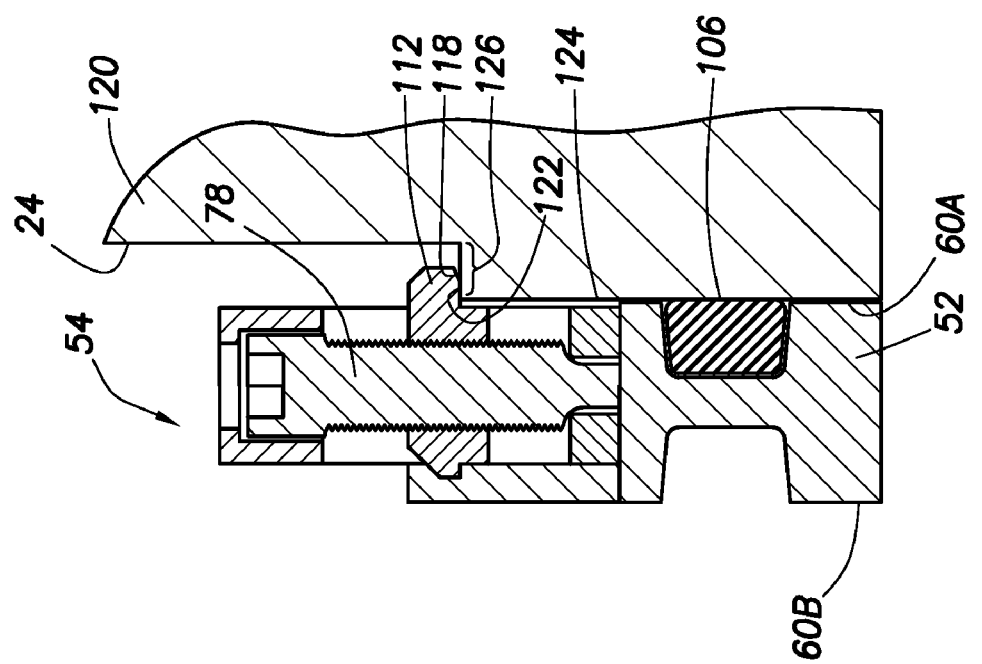
FIG. 6 illustrates a cross-sectional, elevation view of the block assembly interacting with a raised face flange.

FIG. 6 is a cross-sectional, elevation view of the block assembly 54 similar to FIG. 5. Moreover, FIG. 6 illustrates a portion of a raised face flange 120 in operational relationship to the large cog portion 112. In particular, in addition to the mitered portion 118, the large cog portion 112 defines a notch 122. The notch 122 is configured to couple and/or mate to an outside diameter of a raised face 124 of raised face flange 120. Thus, the illustrative large cog portion 112 may be used in operational relationship to a ring groove of a RTJ flange or the raised face of a raised face flange. In the illustrative case of FIG. 6, the offset 126 may be 0.25 inches (6.35 mm), and thus the large cog portion 112 is long enough to interact with the ring groove of a RTJ flange (FIG. 5) and define the notch 122 yet short enough to be used with the illustrated raised face flange. However, the offset 126 of a raised face in relation to the bolt face 24 varies depending on the pressure rating of the flange. For lower pressure ratings, the offset 126 may be significantly less than 0.25 inches (6.35 mm), and in such circumstances the large cog portion 112, if used, may hold the metallic ring 52 and/or o-ring 106 away from the sealing feature of the flange.

Figure 7:
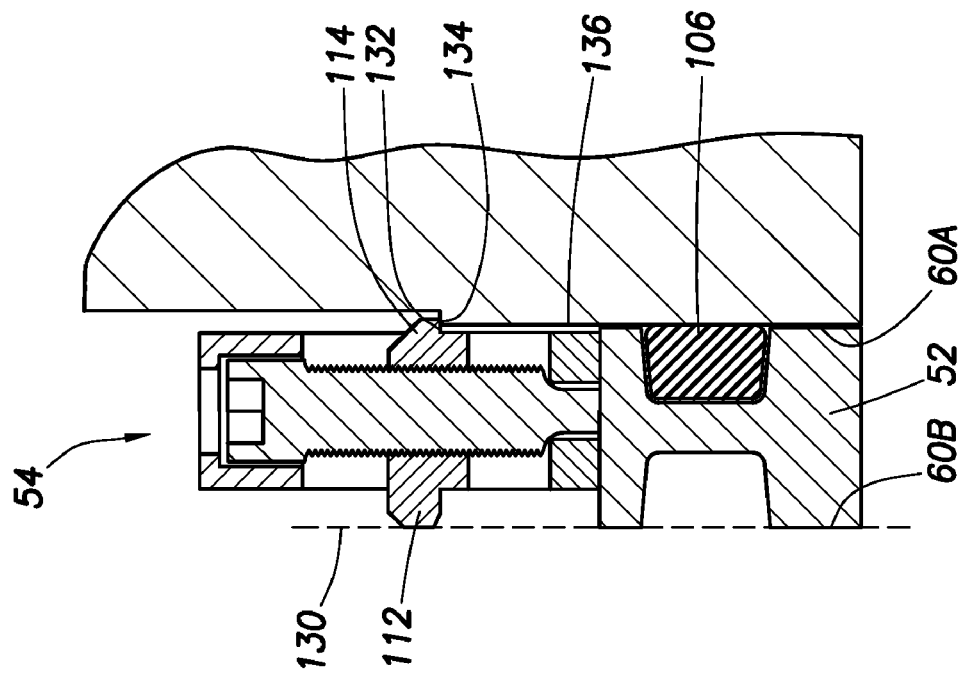
FIG. 7 illustrates a cross-sectional, elevation view of the block assembly interacting with a raised face flange having a raised face offset smaller than illustrated by FIG. 6.

In situations where the large cog portion 112 is too long, the portion of the cog 80 that extends through the plane of the sealing face 60A may be changed by repositioning of the block assembly 54. Returning briefly to FIG. 4, the block assembly 54 is held in place against the metallic ring 52 by way of a plurality of bolts 86 (labeled 86A and 86B in FIG. 4). When the flange seal ring is to be used with a flange where the large cog portion 112 is too long, the block assembly 54 may be removed (by removal of bolts 86), turned 180 degrees, and then re-attached to the metallic ring 52. FIG. 7 illustrates a cross-sectional, elevation view of the block assembly 54 rotated in the metallic ring 52. In particular, rotation of the block assembly 54 results in the small cog portion 114 extending through the plane defined by sealing face 60A and large cog portion 112 being between the plane defined by the sealing surface 60A and plane defined by the sealing face 60B (the plane illustrated by dashed line 130). Small cog portion 114 defines a notch 132. The depth of notch 132 of the small cog portion 114 is smaller than notch 122 of the large cog portion 112. The notch 132 is configured to couple and/or mate to an outside diameter 134 of raised face 136. The offset of the raised face 136 of FIG. 7 is significantly smaller than that of FIG. 6 (e.g., the offset may be 0.06 inches (1.524 mm), thus making use of the large cog portion 112 improper.

Referring simultaneously to FIGS. 6 and 7. In FIGS. 6 and 7, only one flange is shown, the flange that interacts with the cog portion extending through the plane defined by sealing face 60A. Though a second flange is not shown in either FIG. 6 or 7, it is noted that either type flange may be in operational relationship to the sealing face 60B.

Figure 8:
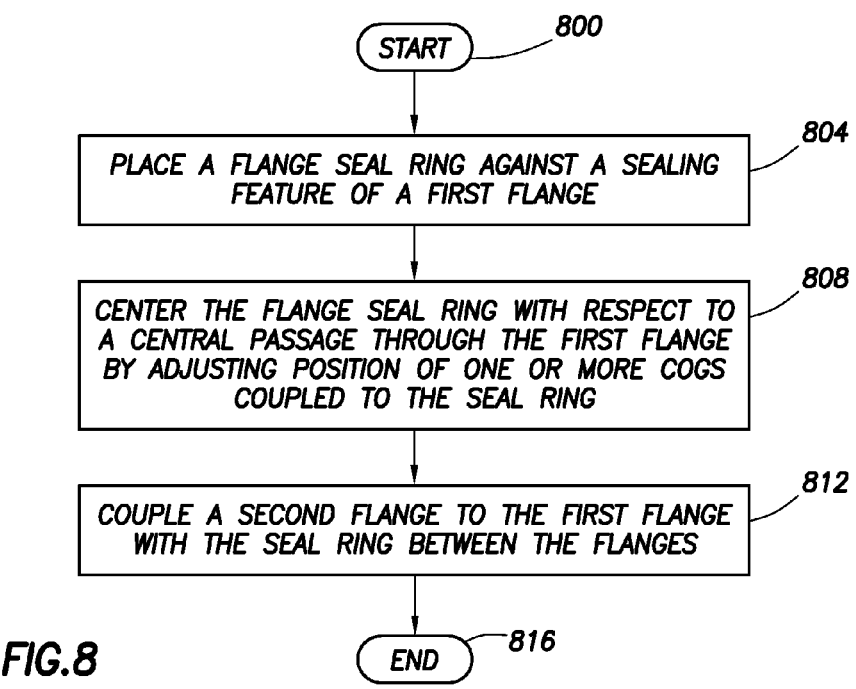
FIG. 8 illustrates a method in accordance with at least some embodiments.

FIG. 8 illustrates a method in accordance with at least some embodiments. In particular, the method starts (block 800) and proceeds to placing a flange seal ring against a sealing feature of a first flange (block 804). For example, the flange seal ring may be placed against a raised face of a raised face flange, or against the ring groove of a RTJ flange. Next, the seal ring is centered with respect to a central passage through the first flange by adjusting position of one or more cogs coupled to the seal ring (block 808). In some embodiments, centering the seal ring comprises adjusting a lead screw coupled to each cog. Finally, a second flange is coupled to the first flange with the seal ring between the flanges (block 812), and the method ends (block 816). The types of flanges that may be connected in accordance with the method may have central bores having substantially the same diameter, but further may have different pressure ratings and/or different sealing surface types.

Using a flange seal ring of the various embodiments may eliminate, or at least reduce, the number of adapters or spools a testing laboratory may need to have on hand. Moreover, even in situations where flanges and pressure ratings as between a meter to be tested and the testing laboratory are the same, the expense of gaskets or metallic ring seals (e.g., $1000 for a large diameter gasket or large diameter metallic ring seal) may be eliminated by the reusable nature of the flange seal ring of the various embodiments.

The above discussion is meant to be illustrative of the principles and various embodiments of the present invention. Numerous variations and modifications will become apparent to those skilled in the art once the above disclosure is fully appreciated. For example, in some embodiments the sealing faces of the metallic ring define their respectively planes by the entire sealing face lying in a plane; however, the sealing faces need not be planar, and other forms may be equivalently used (e.g., convex (bulging outwardly), or concave). It follows that a plane defined by a sealing face may be based any similar feature of the sealing face (e.g., peak of a convex sealing face, or valley of a concave sealing face). It is intended that the following claims be interpreted to embrace all such variations and modifications.

What is claimed is:

1. A seal ring comprising:
 a metallic ring comprising:
  a central bore that defines an internal diameter;
  a first sealing face that defines a first plane, the central bore substantially perpendicular to the first plane;
  a second sealing face that defines a second plane, the central bore substantially perpendicular to the second plane, and the first and second planes parallel;
  a first groove in the first sealing face, the first groove encircles an intersection of the central bore and the first sealing face; and
  a second groove in the second sealing face, the second groove encircles an intersection of the central bore and the second sealing face;
 a plurality of cogs coupled to the metallic ring, each cog extends through the first plane, and the plurality of cogs positioned one each at a plurality of radial positions around the metallic ring;
 at least one of the plurality of cogs configured to have an adjustable position relative to the central bore, and the cogs configured to align the central bore to a corresponding bore of a flange.

2. The seal ring of claim 1 wherein the first sealing face is substantially planar and substantially parallel to the second sealing face.

3. The seal ring of claim 1 wherein a distance of each of the plurality of cogs from the central bore is adjustable.

4. The seal ring of claim 1 further comprising:
 each of the plurality of cogs comprising an aperture with internal threads;
 a plurality of block assemblies, each block assembly coupled to one cog of the plurality of cogs, each block assembly comprising:
  a housing coupled to the metallic ring, the housing defines an interior volume; and
  a lead screw within the interior volume, the lead screw threadingly coupled to the aperture of an associated cog;
 a distance of each of the plurality of cogs from the central bore is selectable by adjustment of the lead screw in each block assembly.

5. The seal ring of claim 1 further comprising:
 each of the plurality of cogs further comprises:
  a first cog portion that defines a notch with a first depth; and
  a second cog portion coupled to the first cog portion, the second cog portion defines a notch with a second depth, the second depth different than the first depth;
 a plurality of block assemblies, each block assembly coupled to one cog of the plurality of cogs, at least one of the block assemblies coupled to the metallic ring in a first orientation where the first cog portion extends through the first plane, and the second cog portion is between the first and second plane.

6. The seal ring of claim 5 wherein the block assembly is configured to couple to the metallic ring in a second orientation where the second cog portion extends through the first plane and the first cog portion is between the first and second plane.

7. The seal ring of claim 1 further comprising:
each of the plurality of cogs further comprises:
an aperture with internal threads;
a first cog portion that defines a notch with a first depth;
a second cog portion coupled to the first cog portion, the second cog portion defines a notch with a second depth, the second depth is different than the first depth;
a plurality of block assemblies, each block assembly coupled to one cog of the plurality of cogs, each block assembly comprising:
a housing coupled to the metallic ring, the housing defines an interior volume; and
a lead screw within the interior volume, the lead screw threadingly coupled to an aperture of an associated cog;
at least one of the block assemblies coupled to the metallic ring in a first orientation where the first cog portion extends through the first plane, and the second cog portion is between the first and second plane; and
a distance of each of the plurality of cogs from the central bore is selectable by adjustment of the lead screw in each block assembly.

8. The seal ring of claim 7 wherein the at least one of the block assemblies is configured to couple to the metallic ring in a second orientation where the second cog portion extends beyond the first plane and the first cog portion lies between the first and second plane.

9. The seal ring of claim 1 wherein the each cog of the plurality of cogs further comprises:
a first cog portion that defines a notch configured to mate to an outside diameter of a raised face of a raised face flange; and
a second cog portion that couples to and extends opposite the first cog portion, the second cog portion configured to mate to a groove of a ring-type joint flange.

10. The seal ring of claim 9 wherein the second cog portion defines a notch configured to mate to an outside diameter of a raised face flange.

11. The seal ring of claim 1 wherein each of the plurality of cogs extend through the first plane perpendicular to the first plane.

* * * * *